(12) United States Patent
Wen

(10) Patent No.: US 10,665,124 B2
(45) Date of Patent: May 26, 2020

(54) SYSTEM AND METHOD FOR LINEARIZING MUSICAL SCORES

(71) Applicant: James Wen, Colorado Springs, CO (US)

(72) Inventor: James Wen, Colorado Springs, CO (US)

( * ) Notice: Subject to any disclaimer, the term of this patent is extended or adjusted under 35 U.S.C. 154(b) by 0 days.

(21) Appl. No.: 15/935,099

(22) Filed: Mar. 26, 2018

(65) Prior Publication Data

US 2018/0277012 A1    Sep. 27, 2018

Related U.S. Application Data

(60) Provisional application No. 62/476,748, filed on Mar. 25, 2017.

(51) Int. Cl.
| | | |
|---|---|---|
| *G09B 15/02* | (2006.01) | |
| *G10H 1/00* | (2006.01) | |
| *G10G 1/00* | (2006.01) | |

(52) U.S. Cl.
CPC .......... *G09B 15/023* (2013.01); *G10G 1/00* (2013.01); *G10H 1/0008* (2013.01); *G10H 1/0033* (2013.01); *G10H 2220/015* (2013.01); *G10H 2220/441* (2013.01)

(58) Field of Classification Search
CPC ...... G09B 15/023; G10G 1/00; G10H 1/0033; G10H 2220/015
USPC ...................................................... 84/477 R
See application file for complete search history.

(56) References Cited

U.S. PATENT DOCUMENTS

| | | | | |
|---|---|---|---|---|
| 5,400,687 A * | 3/1995 | Ishii | ..................... | G09B 15/002 |
| | | | | 84/477 R |
| 5,760,323 A * | 6/1998 | Romero | ............... | G10H 1/0008 |
| | | | | 84/470 R |
| 7,064,261 B2 * | 6/2006 | Shao | ......................... | G10G 1/00 |
| | | | | 84/470 R |
| 7,238,872 B1 * | 7/2007 | Edwards | .................. | B42D 9/04 |
| | | | | 84/486 |
| 7,649,134 B2 * | 1/2010 | Kashioka | ................. | G10G 1/00 |
| | | | | 84/486 |
| 8,431,809 B1 * | 4/2013 | Chan | ...................... | G09B 15/02 |
| | | | | 84/470 R |
| 8,442,325 B2 * | 5/2013 | Hong | .................. | G06K 9/00449 |
| | | | | 382/100 |

(Continued)

FOREIGN PATENT DOCUMENTS

EP    2387029 A1 *  11/2011    ............... G10G 1/00

*Primary Examiner* — David S Warren
*Assistant Examiner* — Christina M Schreiber

(57) ABSTRACT

A standard musical score represented in digital format is analyzed for its constituent parts in order to identify notational directives for traversing through the musical score. A linearized version of the musical score is generated that is in substantially the same visual format but allows the reader to traverse through the musical score exclusively in a forward direction and without need for jumps in a reverse direction or forward jumps beyond the subsequent consecutive page. In certain embodiments, forward jumps may be minimally limited to a page within the musical score while in other embodiments a forward jump may be minimally limited to a line or a measure. In yet other embodiments, reverse jumps may be entirely eliminated while in still other embodiments, reverse jumps within pages may remain unchanged.

20 Claims, 11 Drawing Sheets

(56) References Cited

U.S. PATENT DOCUMENTS

| | | | |
|---|---|---|---|
| 8,445,766 B2 * | 5/2013 | Raveendran | G10G 1/00 |
| | | | 84/470 R |
| 9,747,876 B1 * | 8/2017 | Clarke | G10H 1/0008 |
| 9,865,241 B2 * | 1/2018 | Colafrancesco | G10H 1/361 |
| 9,911,354 B2 * | 3/2018 | Oliver | G09B 15/023 |
| 2001/0037719 A1 * | 11/2001 | Gardner | G09B 15/023 |
| | | | 84/478 |
| 2003/0100965 A1 * | 5/2003 | Sitrick | G09B 15/023 |
| | | | 700/83 |
| 2003/0189582 A1 * | 10/2003 | Pinsky | G09B 15/02 |
| | | | 345/684 |
| 2004/0074376 A1 * | 4/2004 | Varme | G10G 1/00 |
| | | | 84/483.2 |
| 2006/0048632 A1 * | 3/2006 | Morley | G10H 1/368 |
| | | | 84/600 |
| 2008/0092723 A1 * | 4/2008 | Sawyer-Kovelman | |
| | | | G10H 1/0016 |
| | | | 84/724 |
| 2008/0196575 A1 * | 8/2008 | Good | G09B 15/04 |
| | | | 84/470 R |
| 2009/0267955 A1 * | 10/2009 | Ozawa | G06K 15/02 |
| | | | 345/530 |
| 2011/0203442 A1 * | 8/2011 | Raveendran | G09B 15/023 |
| | | | 84/483.1 |
| 2011/0277615 A1 * | 11/2011 | Kendler | G10G 1/00 |
| | | | 84/483.2 |
| 2013/0042746 A1 * | 2/2013 | Shau | G09B 15/023 |
| | | | 84/483.1 |
| 2014/0041512 A1 * | 2/2014 | Mastran | G09B 15/023 |
| | | | 84/483.2 |
| 2016/0247494 A1 * | 8/2016 | Alonso | G10H 1/0008 |
| 2017/0018262 A1 * | 1/2017 | Pinuela Irrisarri | G10G 1/00 |
| 2018/0277012 A1 * | 9/2018 | Wen | G09B 15/023 |

* cited by examiner

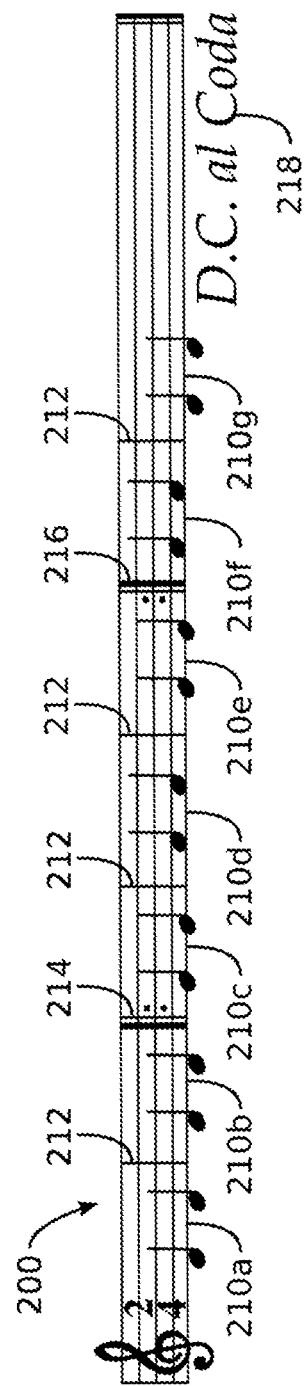

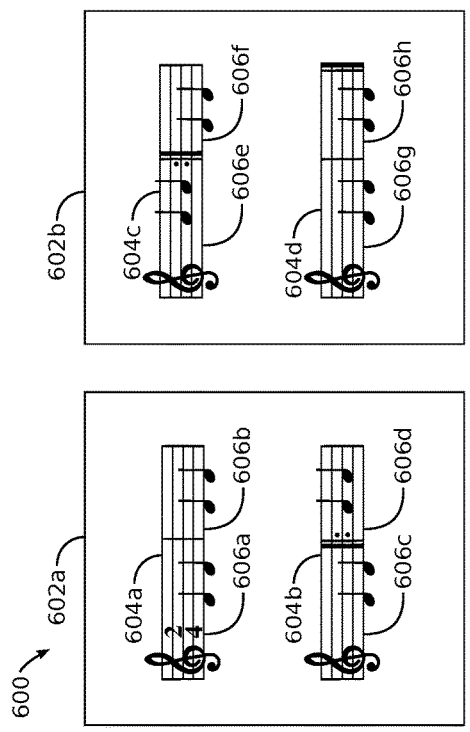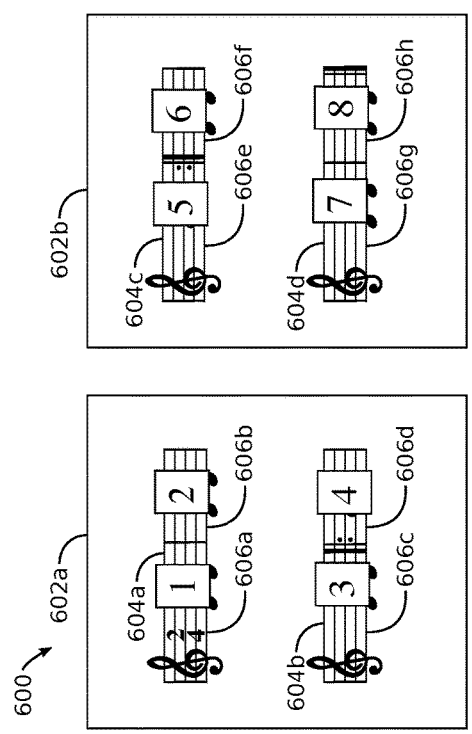

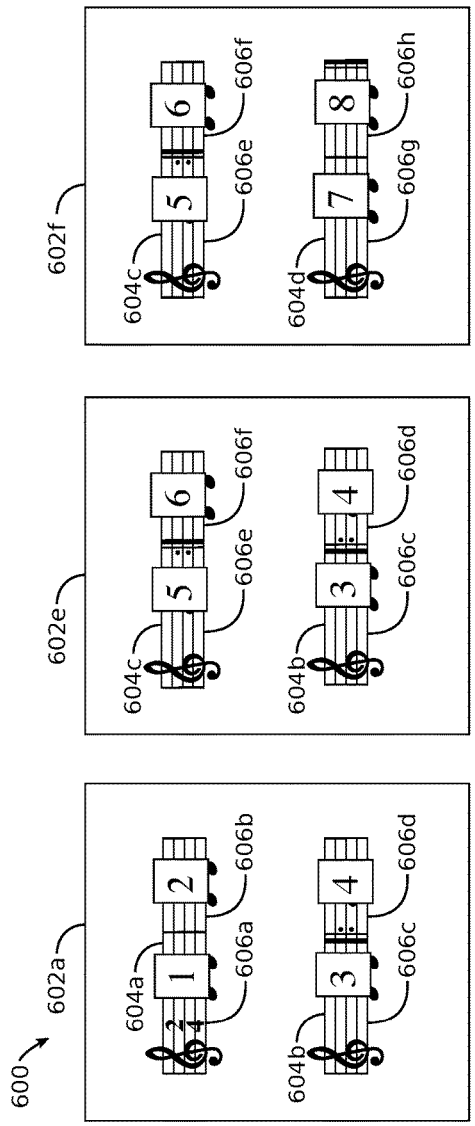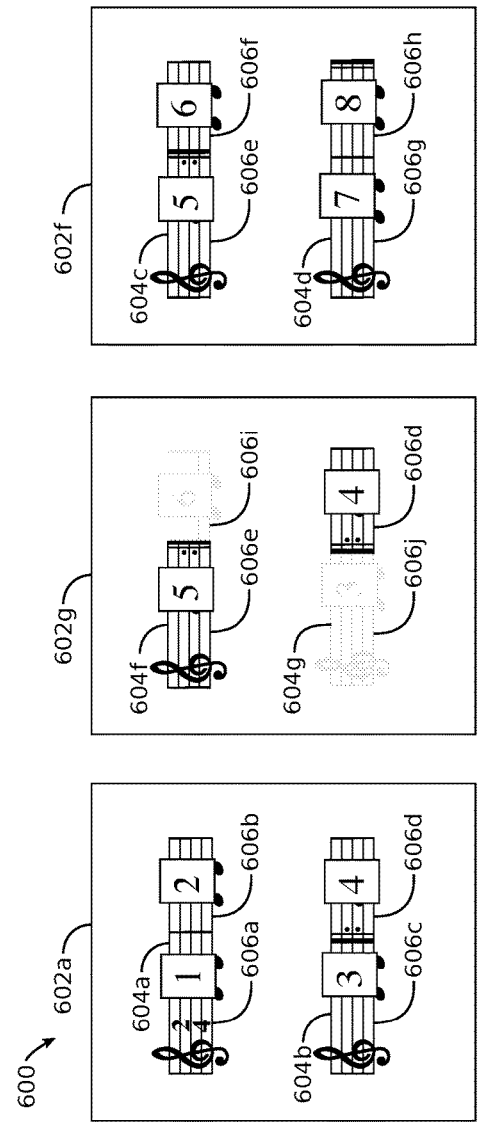
FIG 6D
FIG 6E

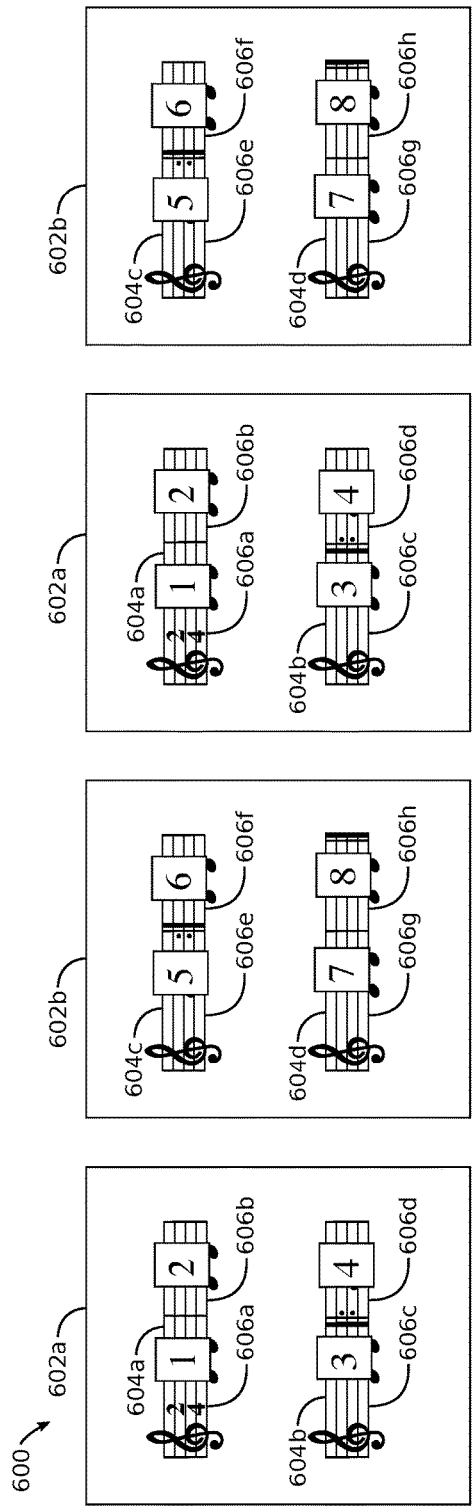
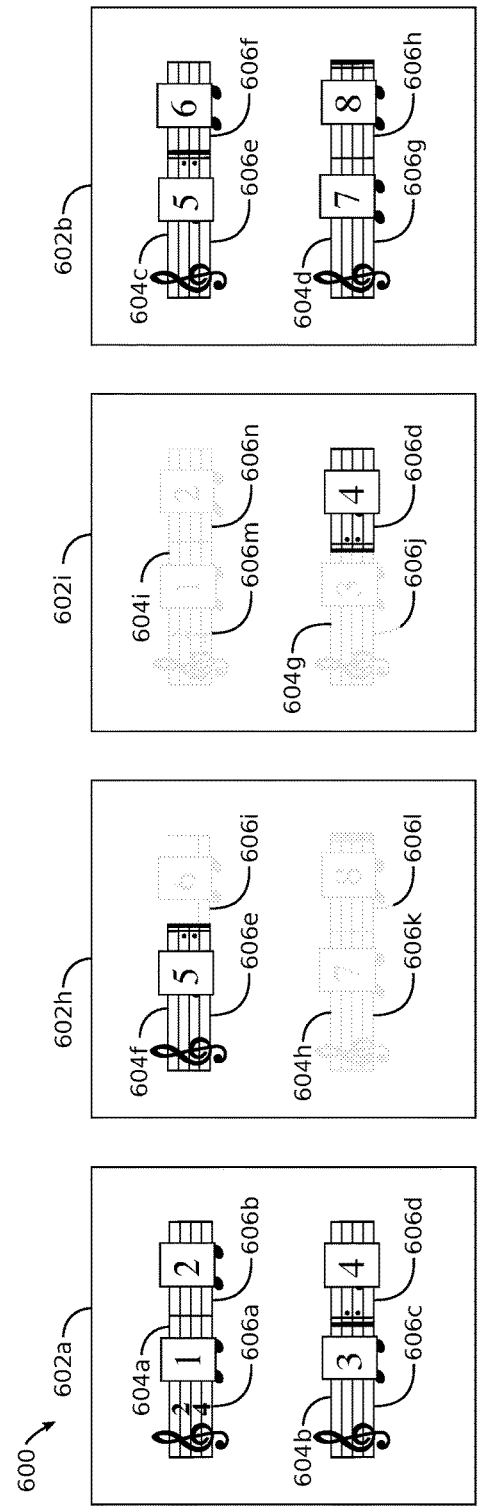
FIG 6F
FIG 6G

SYSTEM AND METHOD FOR LINEARIZING MUSICAL SCORES

BACKGROUND AND PRIOR ART

Musical scores have been used for centuries for representing musical pieces. Traditionally printed on paper, such scores are sometimes referred to as sheet music, with each page of a musical score capturing the notes, rhythm, and sequence of how the musical piece is to be performed. One particularly challenging aspect of performing or practicing with sheet music is the need to physically turn the pages in order to continue with musical scores that extend beyond one page. The act of turning pages interrupts the playing of the instrument and can cause the practice session or performance to suffer. Oftentimes, professionals employ assistants whose job it is to physically turn the music sheets so that the musician can focus on playing. This can be critical for a musician whose instrument is the piano or the violin, where both hands are needed to play the instrument.

Rather than employing assistants, mechanical means to turn pages can be used and U.S. Pat. No. 7,238,872 discloses a mechanical system for automatically turning pages of musical scores. While such a machine can usefully address the simple act of turning pages, musical scores may not be linear entities and may require the musician to move within the score in nonlinear ways.

U.S. Pat. No. 5,760,323 describes an electronic music stand that displays a digital score that can be scrolled via a foot pedal, sound recognition, or a timing mechanism. However, the scrolling is limited to paging forward or backwards, which results in a potential need for repeated scrolling if the musical piece requires the musician to jump forward or backwards by several pages. Without the tactile feedback of physical pages, such repetitive scrolling may result in overshooting the page and a need to reverse the scrolling, thereby disrupting a performance by even a greater amount than the intended goal of saving the musician time and distractions.

Specifically, musical pieces often repeat sections but the physical repetition of such sections in a score can be expensive to create—especially when scores are transcribed by hand—and result in literally heavy burdens for the musicians to carry as well as be wasteful of paper. Consequently, notational shorthand has been created to instruct the musician when a section needs to be repeated, saving on the need to redundantly reproduce the exact same sections multiple times. However, this creates a situation where, unlike a book that the reader simply turns to the next page to continue reading, a musician may need to go back a page when progressing in a musical piece or even jump forward several pages within a score in order to skip over parts that are not included in the repetition. Such nonlinear turning of pages makes the mechanical act of page turning even more disruptive. With the introduction of digital storage media, the possibility of nonlinear traversal without physical overhead became possible.

U.S. Pat. No. 8,431,809 describes an electronic music display that allows the musician to define the points at which a musical score continues on another page that may be earlier in the score.

The system renders visual cues on the digital page to indicate where page turns will occur and additional visual cues indicate where the page will go to when it is turned. However, the system requires manual entry of the repetitions and requires a timer that calculates when a page turn will occur. To have to manually define all the nonlinear jumps in a score before using such a system could be a tedious task and the visual indicators may be distracting. Furthermore, having a timer can be difficult for musicians who are still becoming familiar with the score and need to practice without adhering to a preset timing for progressing through the musical piece.

U.S. Patent 2011/0203442 discloses an electronic display of sheet music that is capable of jumping from one portion of a score to another. The system assumes the existence of sub-module that would require manual intervention to alter, the flow of the music in order to conform to the intent of the musical score. Such manual intervention is costly in terms of time and labor.

In general, systems for electronic display of musical scores are based upon the fundamental unit of the original physical musical page of the sheet music. For example, U.S. Patent 2001/0037719 discloses a system for displaying music sheet where a musician can manually program the flow of the music but the system is based upon the fundamental unit of a page within the score. As well, in U.S. Patent 2008/0092723, a hands-free system for traversing musical scores is based upon the fundamental unit of a page within the score.

While basing the display of musical scores on a fundamental unit of a single page within the score is sensible, it can also be suboptimal for the musician. Specifically, when the correct page has been found, the musician has to know where to look in order since the point where the piece continues may not be at the top of the page but somewhere in the middle of the page. This need to search for the correct position to focus on adds an additional cognitive task for the musician and, taken together, the traversal of a musical score can be far more challenging than the traversal of a standard book which is generally in a linear fashion. With respect to musical scores, there is a need for an understanding of the structure of the musical score in order to traverse the score as intended.

In U.S. Patent 2006/0048632, the musical score is broken down into atomic units, each unit comprising of at least one musical note, which are then displayed in a browser. While such a system may be suitable associating audio components to a score and for providing a musician with minute control over the elements of a musical piece, it does not address the issues relating to the traversal of a piece of music that may potentially be nonlinear due to repetitions within the piece.

In U.S. Pat. No. 8,442,325, a method for recognizing musical score images is disclosed whereby the lines of a musical staff is detected and separated from the notes. The disclosed method is used for generating a sound corresponding to the musical notes, and does not use the understood components of the musical score to sequence the musical components in order to aid a musician in traversing the score.

U.S. Pat. No. 5,400,687 describes a musical score display that can accommodate the basic elements of a musical score, including repeat instructions such as Da Capo, Dal Segno, Al Fine, and other constructs. However, the system is based upon musical data that need to be created specifically for the pieces of music being displayed. Thus, the described system does not have the ability to take advantage of the huge corpus of existing musical scores, such as classical pieces by Beethoven, unless the laborious work of converting standard music notation to the needed musical data format is undertaken manually.

U.S. Pat. No. 8,530,735 describes a system that replaces displayed portions of a musical piece with subsequent portions of the same musical piece so that the display is synchronized with a performer. The system is well suited for performers, such as singers in a karaoke setting where the performer needs to follow some existing musical guide. However, the system is not based upon standard musical scores and so has no concept of musical structure represented in the sheet music format preferred by classical musicians. It is therefore unable to take advantage of existing musical scores but will need to have some system of converting existing scores to an internal format.

It can be seen that there is a need for a system and method to display traditional paper-based musical scores using an electronic device. It can also be seen that there is a need for a system to allow page turning in a manner that conforms to the progression of the musical piece while minimizing the possibility of turning to the wrong page. Furthermore, it can be seen that there is a need for a system that presents the established visual format of musical scores but is freed from the limits of being constrained to music sheet pages which require cognitive effort by the musician to find the continuation point when a jump within the musical score is made. Finally, it can be seen that it would be advantageous for such a system and method to take advantage of the large corpus of existing musical score by automating the ingestion of the scores so that the musicians will not need to manually enter data for each score they desire to use.

SUMMARY OF THE INVENTION

Accordingly, it is the intent of this disclosure to describe a system that displays, through an electronic device, musical scores in a manner that is visually comparable and similar to paper-based sheet music and, in a manner that avoids the potentially distracting act of jumping over multiple pages or backwards through the musical score in a nonlinear fashion by linearizing the musical score so that all progress is forward and without jumps over multiple pages. The disclosed invention provides traversal between parts of the musical score based on units smaller than an entire page so that direct access to parts of a musical score may be possible without a need to retrieve content from an entire page regardless of whether all of the material within the page is desired. The disclosed invention also automates the process of converting standard musical scores into a linearized form so as to take advantage of the large corpus of musical scores already in existence without relying upon costly manual conversion.

OBJECT AND ADVANTAGES

Accordingly, it is therefore an objective of the present invention to provide a digital display of a standard musical score that is substantially a visual equivalent of the paper-based version traditionally used by musicians for playing music.

It is also an objective of the present invention to recognize musical constructs in standard musical scores and to encode such constructs into an internal digital representation that is context-sensitive to how a musical score is traversed by a musician in order to replace the nonlinear jumps with simpler linear progress through musical scores.

It is another objective of the present invention to take advantage of the wealth of existing musical scores by providing an automated process of extracting standard musical score notation into an internal digital representation.

These and other objectives of the present invention will become clear to those skilled in the arts upon review of the following specifications and description.

BRIEF DESCRIPTION OF THE DRAWINGS

Embodiments of the present invention will be described with reference to the drawing, wherein like designations denote like elements, and:

FIG. 2 illustrates some components of a musical staff that are relevant to the description of the present invention.

FIGS. 6A-6H illustrate the process of the present invention linearizing traditional musical scores by musical units corresponding to measures, lines, and pages.

DETAILED DESCRIPTION OF THE INVENTION

Figure 1A:
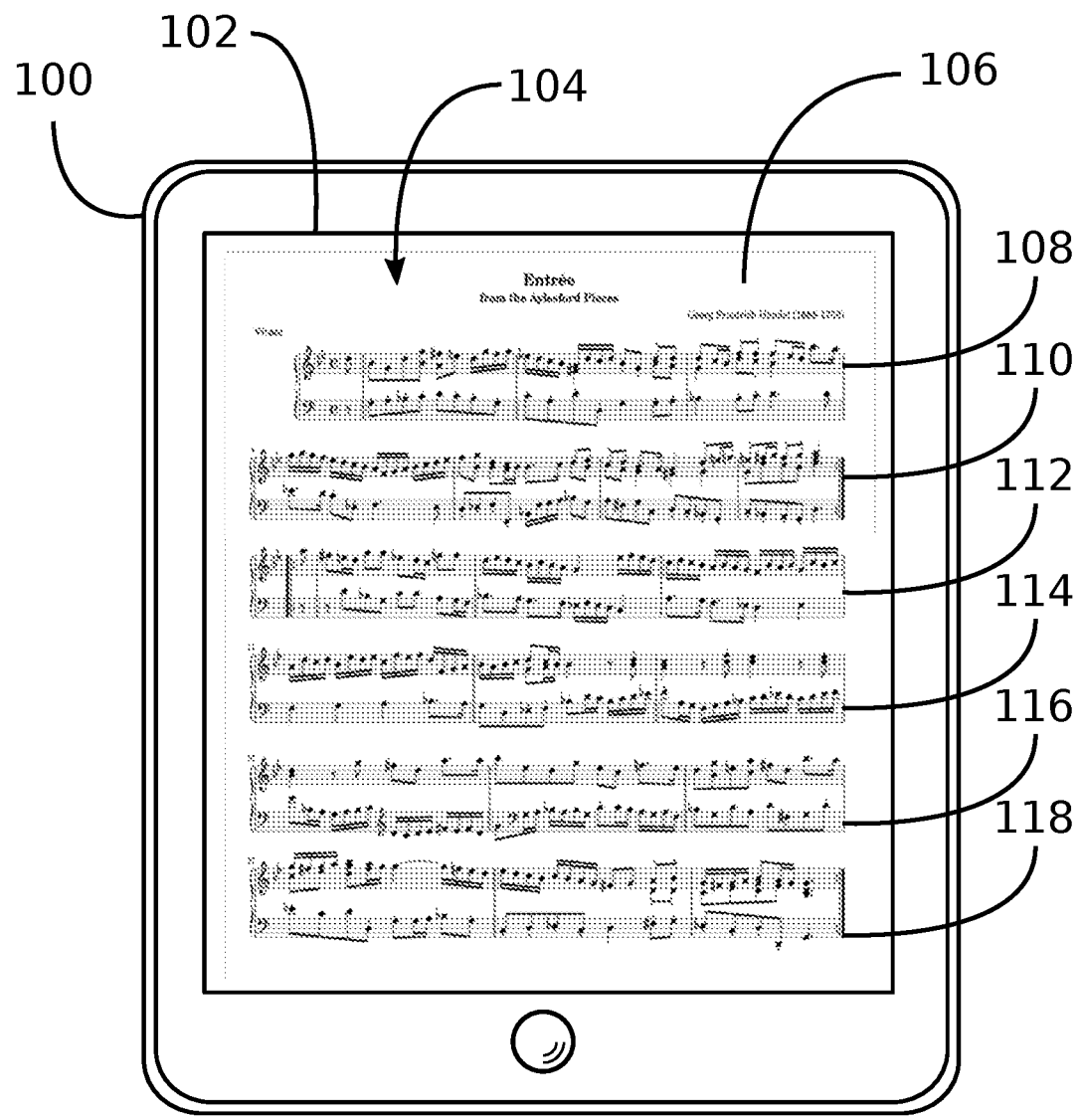
FIG. 1A depicts a section of a musical score rendered on a tablet computing device.

Referring to FIG. 1A, in some embodiments of the present invention, the system for linearizing traditional musical scores is resident on computing tablet device 100, tablet device 100 includes a display 102. Tablet devices are commonly available commercially and include such common devices as the Apple iPad and a variety of Android operating system based tablet computers. FIG. 1A depicts a page musical score 104 rendered upon display screen 102 in a manner indistinguishable from common music notation used in standard sheet music and familiar to musicians. Page of musical score 104 includes a title section 106, followed by several grand staves 108, 110, 112, 114, 116, and 118 of musical notation, each grand staff comprising of two sets of musical staves, each musical staff comprised of five substantially long, horizontal lines. In this exemplary illustration, each grand staff is comprised of two musical staves joined by a vertical bar at the left end of the staves but it is understood that the composition of musical staves within grand staves may be structured differently depending on the intended instruments of the musical score. For example, a violin grand staff is comprised of exactly one musical staff while a piano grand staff, a shown in FIG. 1A, is comprised of two musical staves. Musical scores for other types of instruments or groups of instruments would have other configurations. Each grand staff is comprised of several measures with each measure delimited by vertical barlines.

Figure 1B:
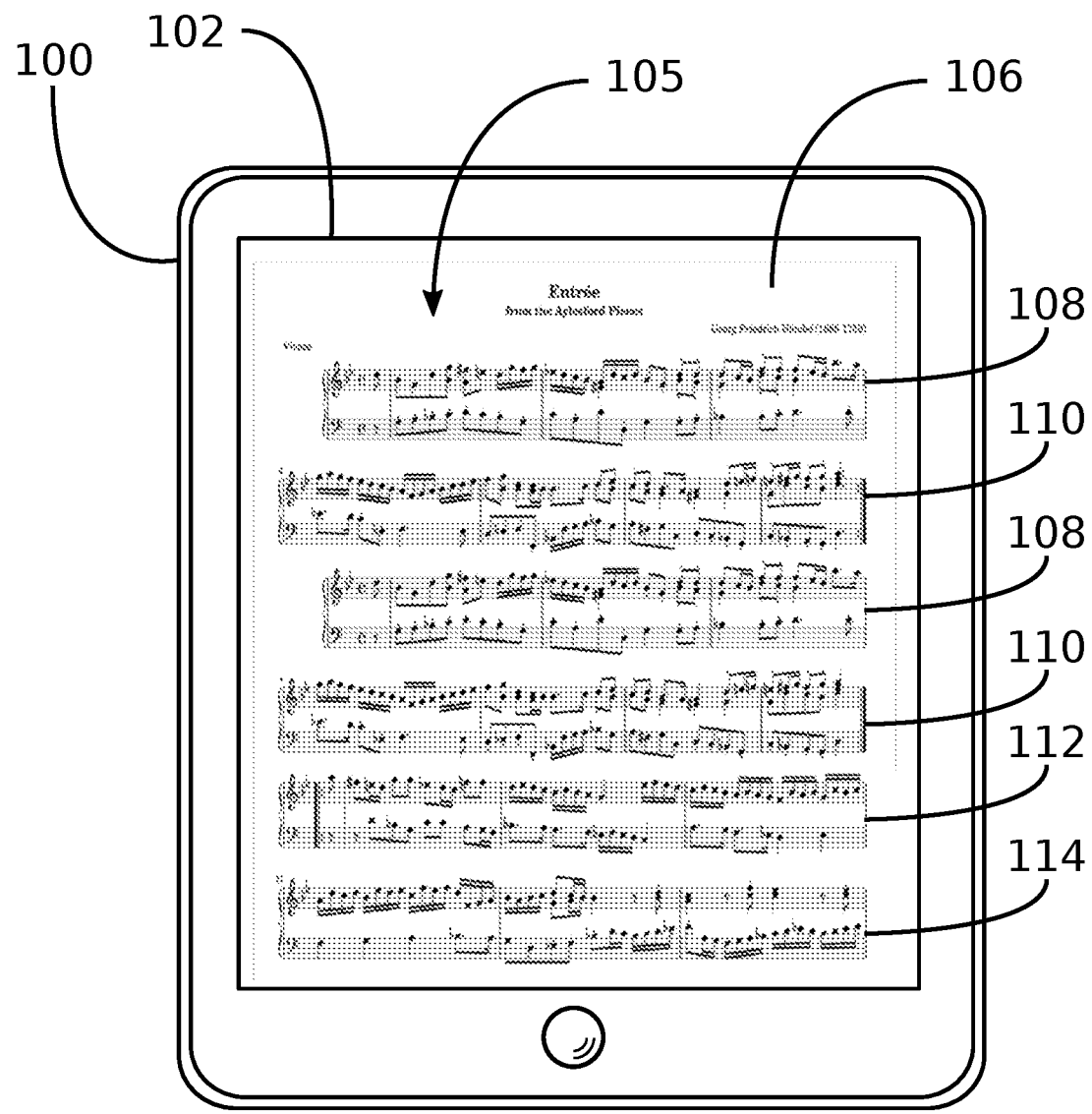
FIG. 1B depicts a section of the same musical score depicted in FIG. 1A after having been linearized by the present invention and rendered on a tablet computing device.

Referring now to FIG. 1B as well as FIG. 1A and where like numerals identify corresponding parts throughout the views, a depiction of a page of linearized musical score 105 is musically equivalent to page of musical score 104 from FIG. 1A but is visually different due to the linearization of the present invention. It can be seen, in this example, that title 106 is also followed by grand staves 108 and 110 but, departing from page of musical score 104 in FIG. 1A, page of linearized musical score 105 repeats grand staves 108 and 110 immediately after rendering a first set of grand staves 108 and 110. In this way, the reader's eyes will not need to return to an earlier section of a musical score after it has been linearized but can continue moving forward in the score. After the repeated set of grand staves 108 and 110, page of linearized musical score 105 continues with grand staves 112 and 114 so as to offer the equivalent musical piece as page of musical score 104 although the amount of musical notation needed is greater in the linearized musical score due to the explicit representation of repeated sections and so more digital pages will be needed in the linearized musical score.

In general, the lines that are linearized may not need to be on the same page and can span over separate pages. It is noted that, in standard music notation, such exact copies are generally omitted and the musician is directed to repeat particular sections of music based upon the notation given. However, in the present invention, such repeated sections are duplicated so that musicians will be able to progress through the entire musical piece without having to return to a previous section of a musical score. In general, the system and method of the present invention will replace all references to earlier parts of a musical score and all jumps to subsequent non-consecutive parts of a musical score with simple, short forward movement within a linearized musical score.

Referring now to FIG. 2, an example of a part of a musical score is shown depicting, for instructional purposes, a musical staff 200 which is part of a larger musical score that generally includes many such musical staves over a number of pages. By way of musical notation background, a musical staff is an arrangement of five horizontal lines and four spaces that separate the lines, where each line or space of the musical staff represents a different musical pitch. The horizontal dimension of the musical staff generally specifies a relative time relationship for musical notes or symbols positioned on the musical staff and the vertical dimension of the musical staff specifies a pitch relationship for the musical notes. A musical staff is divided into sections generally referred to as bars or measures, each measure representing a particular time span of music and separated from the measure immediately preceding it or following it on the same line by a barline.

Still referring to FIG. 2, musical staff 200 is divided into measures by a number of separating bars, some of which demarcate the boundary between measures while others additionally provide instructions for traversal through the musical score. For example, measure 210a and measure 210b are separated by vertical barline 212. Measure 210b and 210c are separated by opening repeat sign 214. Vertical barlines 212 separate measures 210c, 210d, and 210e. Closing repeat sign 216 separates measures 210e and 210f. Measure 210f is separated from measure 210g by another vertical barline 212.

Musical staff 200 generally progresses linearly stepwise from one measure to a consecutive measure immediately thereafter. For example, starting at measure 210a, the music score is read one measure at a time through measures 210b, 210c, 210d and 210e. However, non-linear jumps can occur as when closing repeat sign 216 is encountered at the end of measure 210e, directing the progression of music to return to the closest preceding opening repeat sign 214 which is at the beginning of measure 210c. In such a case, measure 210e is regarded as a takeoff measure from which a non-linear jump is made to measure 210c, which is regarded as its counterpart landing measure from which the music progresses. Without additional instructions, closing repeat sign 216 is only effective once and when measure 210e is visited a second time, the second encounter of closing repeat sign 216 is no longer interpreted as a return to the closest preceding opening repeat sign 214 but, instead, proceeds directly from measure 210e to measure 210f. Other instructions for non-linear jumps between measures may be presented in different forms, such as instruction 218, represented as the phrase D.C. al Coda which instructs the musician to regard measure 210g as a takeoff measure from which to return to the beginning of the musical score at measure 210a, which is regarded as the landing measure from where the music continues until reaching another instruction indicating a jump to a point in the musical score represented by a coda symbol. Additional non-linear instructions within musical scores exist, including volta brackets and other musical notational devices known to musicians with standard skills for reading musical scores.

Figure 3:
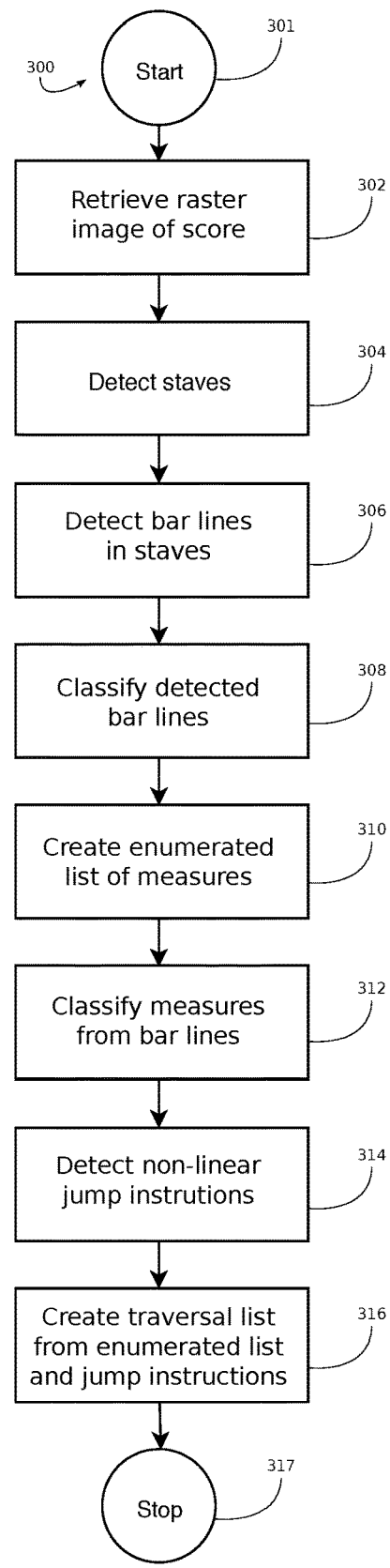
FIG. 3 is a functional flow chart of the steps of execution used by a system implementing the system of the present invention.

Referring now to FIG. 3, a flowchart diagram 300 of the preferred embodiment of the present invention is shown. Flowchart diagram 300 begins at an initial entry point 300, which directs execution to a step 302 for obtaining a digitized version of a traditional musical score as a rasterized image. In some embodiments, the digitized version of a traditional musical score can be obtained via the internet access to an existing digitized version of a traditional musical score. For example, the Mutopia Project (www.mutopiaproject.org) has made thousands of musical scores that are in the public domain, such as Beethoven sonatas or Mozart concertos, freely download on a Creative Commons License and in a standard format such as PDF (Portable Document Format) or PNG (Portable Network Graphic). The retrieved image is assumed to either be convertible to a rasterized digital format (such as PDF) or is already in a rasterized digital format (such as PNG), where the musical score is stored as an image that is organized as a matrix of pixel values.

In still other embodiments, digitized scores may be directly accessed through digital data transfer from a digital storage device, such as an external solid state memory stick, an internal on-board RAM (Random Access Memory) unit, a connected digital musical instrument, or through some other hardware device or software application. These and other ways of transferring data between devices from a source to a computing device such as the one in the present invention, are well known to those skilled in the arts.

In general, digitized scores may be stored in a variety of formats including a vectorized format, such as PDF, wherein the represented image is not accessible directly as pixel values through given coordinates, but as instructions for creating the represented content with a vector-based rendering system. Other digitized scores may be stored as MIDI (Musical Instrument Digital Interface) files or some proprietary musical notation format. Because obtaining rasterized versions of files stored in these and other digital formats can be accomplished through existing software and are well known to those skilled in the arts, the disclosure for the present invention assumes, without loss of generality, that the digitized musical score is considered to be one or more rasterized images where each pixel of an image is accessible by its position within the image through its row and column values within the image.

In some embodiments, a rasterized version of a traditional musical score can be obtained through the use of a digital camera to capture an image of a musical score, the capturing process typically creating a compressed data file in PNG, JPG (Joint Photographic Expert), or some other data file format which support conversion into rasterized form. The image data is generally stored in memory storage associated with the camera and can be accessed through any number of wired or wireless connections known to those skilled in the arts. Additional substeps may include routines to remove distortion from poor camera angle, the automatic adjustments of brightness and contrast to enhance the legibility of the score, image rotation to account for alignment that does not match with the main vertical and horizontal axes of the image, and other image processing procedures to improve the overall quality of the image to be analyzed that are well known to those skilled in the arts.

The rasterized images are assumed, without loss of generality, to be comprised exclusively of completely black or completely white pixels. Although typical images may include other pixel values, such as from gray pixels resulting from anti-aliasing routines to smooth images, from off-white color areas inherited from the original paper-based score from which the digitized musical score is based, from shadows cast on the paper during the digitization process, or from a number of other causes innate to the original score or introduced through the digitization of the musical score, image processing techniques including edge detection, contrast adjustment, color separation, artifact removal, and other heuristics well known to those skilled in the arts exist to address such issues so that any rasterized musical score can be converted to an image consisting of only black and white pixels.

Figure 4:
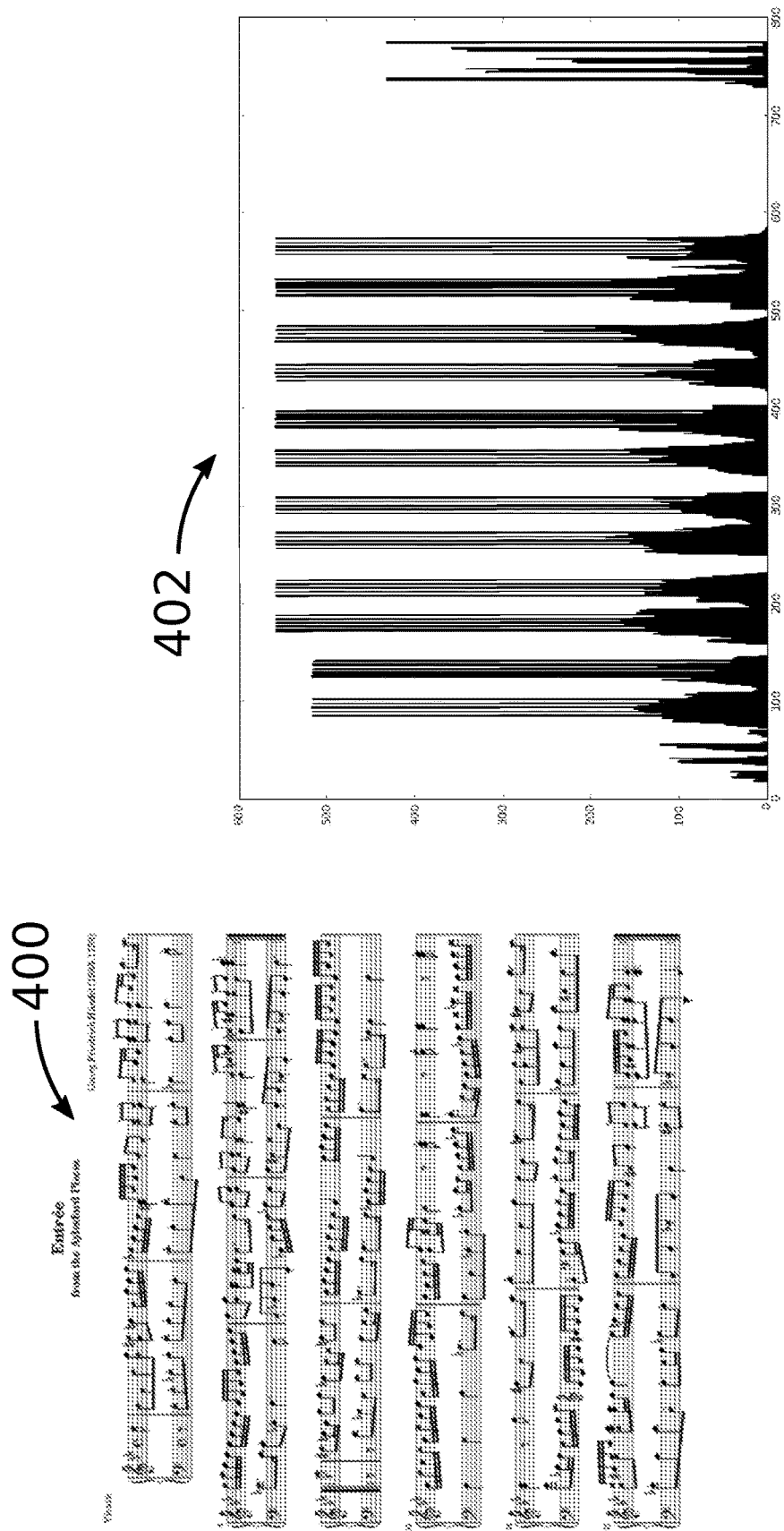
FIG. 4 depicts an example from an embodiment whereby musical staves are detected through the row-wise counting of black pixels in a rasterized page of a musical score.

Once a black and white rasterized representation of a musical score has been obtained; a step 304 is executed to detect musical staves. In one embodiment, the rasterized representation is analyzed, row by row, to generate a row-wise count of black pixels. The resulting vector of black pixel counts is traversed and counts that exceed a minimal of threshold value are considered possible staff line candidates. A possible value to use as the minimal threshold value is 75% of the maximum count, indicating that the row has a long line. Referring now to FIG. 4, an illustrative example of a musical score and the resulting histogram generated from adopting the approach as described is provided. It can be seen that that the analysis of musical staff 400 will result in a data set substantially similar to histogram 402 where certain rows can be considered long lines, which would be a necessary component of a staff set, and other rows have relatively few black pixels in comparison.

If five such long lines are detected so that each of the aforementioned five long lines are a certain separation distance apart from its neighboring line and the topmost long line, should it have another long line above it, is separated from the aforementioned long line above it by a distance substantially greater than the aforementioned separation distance separating lines within a staff and the bottommost long line of the aforementioned five long lines, should it have another long line below it, is separated from the aforementioned long line below it by a distance substantially greater than the aforementioned separation distance, then the group of five lines is considered a staff line set. The substantial distance referenced can be, as an example, a distance at least double the aforementioned separation distance. Rasterized images of musical scores are guaranteed to have at least one such staff line set and, depending on the intended instruments, musical scores may group several staff line sets together into a grand staff, which can be detected by following a vertical line that connects all the staff line sets into one unit. For the remainder of this disclosure, the terms grand staff, musical staff, and staff will be considered to equivalently refer to a grand staff and will be used interchangeably without loss of generality.

In other embodiments, the staff detection routine can be completed with other approaches, such as a connected-component labeling algorithm to detect contiguous shapes that can be compared against staff-like structures in order to determine whether they are staff lines. Referring now again to FIG. 3, numerous algorithms and heuristics for extracting structures within images for identification against known shapes exist are well known to those skilled in the arts and can be usefully applied in step 304.

Referring still to FIG. 3, for each staff found, step 306 is executed to detect barlines within the staff that separate the staff lines into musical measures, each of the musical measures occupying a pre-defined duration of time through musical notes and rests. A portion of the rasterized image corresponding to the found staff, from step 304, is scanned for vertical lines that span the defining height of the staff. In some embodiments, the scanning process can involve counting the number of black pixels for each column of the staff. It is understood that the defining height of the staff includes all the constituent staves in some cases and, in other cases, the defining height consists of only a partial subset of constituent staves so that lyrics, distinction between instruments, or some other reason for defining short barlines can be realized. In other embodiments, line tracing algorithms or other heuristics known to those skilled in the arts can be used to find barlines.

Once barlines are detected for each staff, a step 308 classifies detected barlines into one of a number of different types of barlines that separate staff line sets into measures: a standard barline that simply defines the boundary between separate musical measures, a barline pair that separate musical measures and additionally indicates some significant change such as a new musical key or time signature, an opening repeat sign, or a closing repeat sign. After classification step 308 is completed, in the preferred embodiment, the musical measures defined by barlines are appended into an enumerated list at a step 310 so that each measure in the musical score can be uniquely identified by an associated enumerated identifier.

In the preferred embodiment, the enumerated measures are associated with their surrounding barlines and are classified at a step 312 as a standard measure, as a repeat-start opening repeat measure, or as a repeat-end closing repeat measure and stored in memory of the computing device. A standard measure has barlines or barline pairs at both ends of the measure. A measure that starts a repeated section has an opening repeat sign at the start of the measure and a measure that ends a repeated section has a closing repeat sign at the end of the measure. A measure that starts a repeated section, having an opening repeat sign at the start of the measure, can be regarded as a landing measure while a measure that ends a repeated section, having a closing repeat sign at the end of the measure, can be regarded as a takeoff measure so that the repetition of the section is executed at the completion of the takeoff measure though a non-linear jump to the landing measure where the progress of the music continues.

In addition to repeat signs, other jump instructions may be included in a musical score and a step 314 searches for additional jump instructions by scanning the rasterized score for text and symbols just above the staff lines that directs a jump to a non-consecutive measure. In some embodiments, OCR (Optical Character Recognition) techniques may be employed to detect jump instructions. Jump instructions are associated with the measures that the detected instructions are directly above and the directive given by the detected jump instruction is coupled with the associated measure in the storage memory so that a query of a measure with a jump instruction would yield the destination of the jump.

Figure 5:
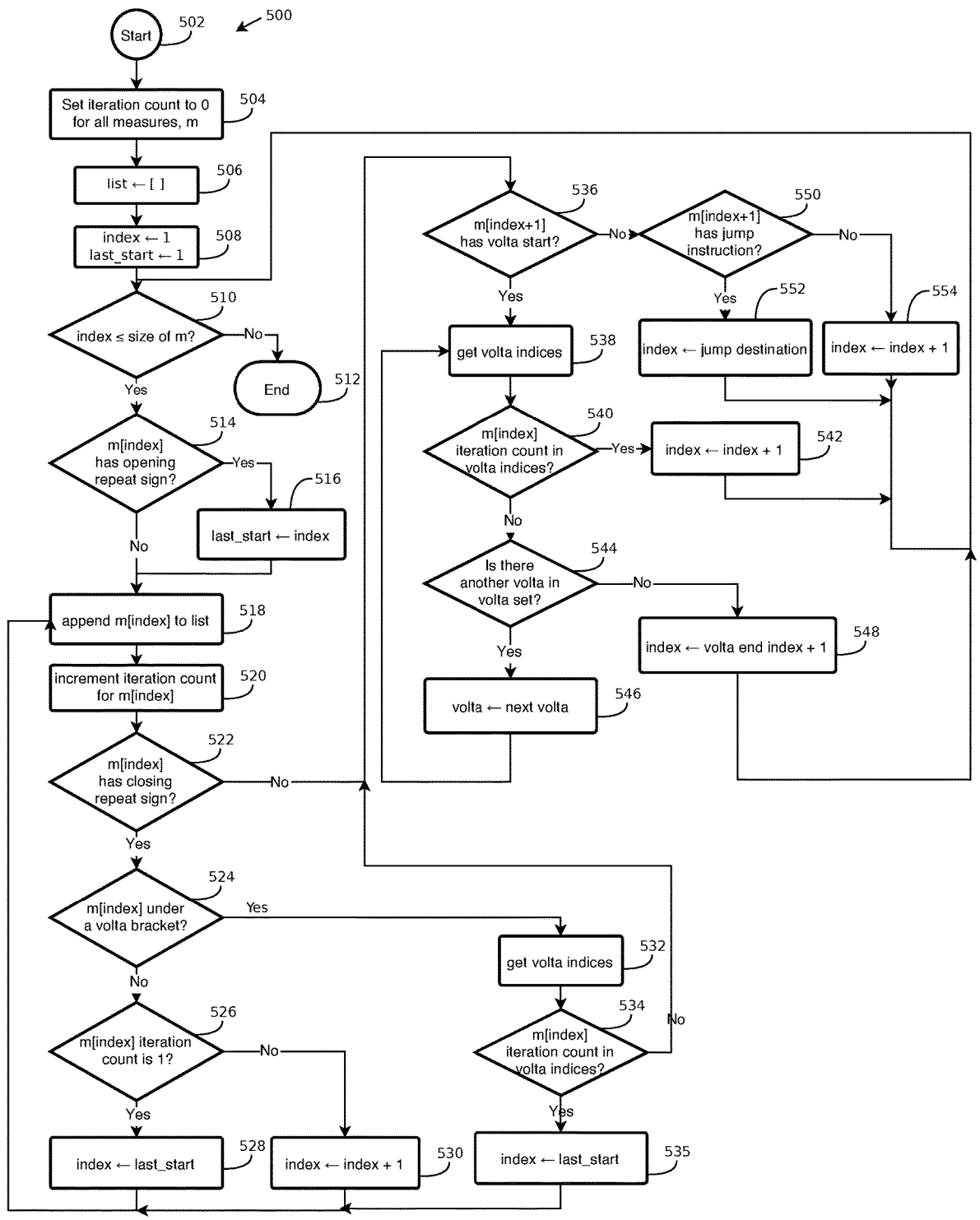
FIG. 5 is a functional flow chart of the steps of execution used by a system implementing the linearization routine of the present invention.

A step 316 traverses through the list of enumerated measures and builds a linearized traversal list of measure references based upon the order of visitation of the aforementioned enumerated measures. Referring now to FIG. 5 as well as FIG. 3, an expansion of this step is show in a flowchart 500 starting at a step 502. The measures detected and classified from steps 306 through 312, inclusive, can be stored as an array or some other form of data structure in the working memory within or somehow connected to the computing system of the present invention. In some embodiments, the data structure can be an array, as shown here for descriptive purposes, but in other embodiments, the data may vary and can be some sort of list, stack, heap, or any number of other data structures that allows retrieval by an index directly or indirectly, and which are well known to those skilled in the arts. For the sake of simplicity and without loss of generality, the data structure is assumed to be an array and is hereafter referred to as m, with each element of m referred to by its position, p, within the array m by the notation m[p].

In a step 504, each measure is associated with an iteration count variable initialized to zero so that each measure can keep track of the number of visits made. A traversal list, here referred to as list, will hold the final linearized musical score, is initialized to an empty list at a step 506. An initialization of variables occur in a step 508, where a shared variable for accessing elements of the array, m, and here referred to as index, is initialized to 1, referring to the first measure in the data structure. Also, in the same initialization step 508, a variable keeping track of the index for the measure that would begin a repeated section, here referred to as last_start, is initialized to 1, indicating that any repeat instructions without a landing measure—a point from which the repeated section is to begin—will start from the first measure, or the beginning of the musical score.

In a step 510, a check is made to see if the index variable is less than or equal to the total number of measures in the array m. If not, then the entire musical score has been processed, and the linearization process is terminated at a step 512. On the other hand, if the index variable is less than or equal to the length of the array, m, then execution continues at a step 514, where the classification of the bar line defining the beginning of measure m is checked to determine if the aforementioned bar has been classified as a left repeat bar, which defines the beginning of a repeated section, also referred to as a landing measure. If the bar line is, in fact a left repeat bar defining the beginning of a repeated section, then the conditional at step 514 branches to a step 516 which updates the last_start variable to hold the value of the index variable indicating that the next repeat will start at the current measure being considered. Execution then continues and merges with the execution flow from the negative branch of the conditional at step 514 corresponding to the case that the bar line at the beginning of the measure not been a left repeat bar, which bypasses the update to the variable last_start.

Execution then proceeds to a step 518, which appends the current measure to the list variable, which represents the linearized music score being constructed and heretofore will be referred to as the traversal list. In the exemplary flowchart presented for this embodiment, the measure is added to a list data structure. In other embodiments, other approaches may be taken to construct the traversal list such as having an array holding indices to the measures, or some other data structure that is able to retain an ordered list of items. Many implementation possibilities exist to provide an equivalent solution to keep track of such a list and are well known to those skilled in the arts.

After the current measure is appended to the traversal list at step 518, a step 520 increments the iteration count in the aforementioned current measure to keep count of the number of times the measure has been visited. A conditional check is now made at a step 522 to see if the bar line defining the end of the current measure is a right repeat bar, indicating that the measure is a repeat measure, also referred to as a takeoff measure. If the conditional check at step 522 indicates that the current measure, m[index], has a right repeat bar indicating that the music could potentially return back to where the measure at the last_start variable, execution proceeds to a step 524 where a check is made to see if the current measure is under a volta bracket. Such a check can be accomplished in a number of ways. For example, the horizontal center of the measure, within the rasterized image of the current page of the musical score, can be calculated and a vertical line can be extended from the top staff line upwards until a black pixel is encountered at a certain distance from the top of the uppermost staff within the current grand staff of the measure. The certain distance is generally within a fraction of the height of a staff within the grand staff unless musical notes extend beyond the top of the staff so as to expand the region within which the grand staff occupies. Heuristics for calculating the bounding box of a grand staff based upon notes within the grand staff are well known to those skilled in the arts. If a black pixel is detected and can be traced along the horizontal direction so as to extend to both ends of the measure, it is a candidate for a volta bracket. Further, the detected volta bracket candidate should have a hanging end in the left end—or, beginning of the volta bracket—whereby the substantially horizontal line turns ninety degrees downward to form a corner with a vertical segment although it should be noted that a volta bracket may extend over several measures and possibly over several lines. Many approaches to identifying structures such as volta brackets exist, such as using pattern matching algorithms, using image processing techniques, and using other heuristics well known to those skilled in the arts.

If the current measure, m[index], is not under a volta bracket, then a conditional check is made at a step 526 to see if the iteration count of the current measure is 1, meaning that it is the first time the current measure is being visited, in which case execution branches to a step 528 to assign, to the index variable, the value of the variable last_start, which refers to the landing measure, or the measure where the repeated section begins. At this point, execution returns to step 518 where the first measure of the repeated section is appended to the traversal list.

If the iteration count at step 526 was not 1, then it will necessarily be 2 at this point, indicating that the takeoff measure, or the measure with the right repeat bar is being visited for the second time. In such a case, where the repeated section has already been repeated and is not under a volta bracket, the progress through the musical score continues to the next consecutive measure and the current measure index is incremented by one at a step 530 before execution is sent back to step 518 to append the next measure to the traversal list.

If the current measure that has a right repeat bar is under a volta bracket, then the conditional branch at step 524 continues to a step 532, which retrieves the iteration indices under the volta bracket, a set of iteration indices always being associated with volta brackets in common musical notation in order to indicate the iterations to be played under the volta bracket. A number of approaches exist to recognize the numbers indicated by the indices under the volta bracket such as OCR (Optical Character Recognition), machine learning, or other algorithms well known to those skilled in the arts. Once the volta indices are retrieved and recognized as decimal numbers at step 532, a step 534 checks to see if the iteration count of the current measure matches one of the retrieved iteration numbers. If so, execution branches to a step 535 where the index is assigned the value of the last_start variable sending the progress of music back for another repetition. Execution, in this case, continues at step 518 where the landing measure—first measure of the repeated section—is appended to the traversal list.

If the iteration count of the current measure, which has a right repeat bar and is under a volta bracket and so may be a takeoff measure, is not in the list of volta indices, then execution proceeds to a conditional at a step 536 where a look-ahead heuristic is adopted to examine the next consecutive measure, namely m[index+1], to check for a volta bracket start. The execution flow in this case merges with the negative branch from the conditional at step 522, where it was determined that the right bar of the measure under consideration is not a repeat bar—meaning the measure cannot be a takeoff measure—and a look-ahead is necessary to see if the measure immediately following the current measure is under the beginning of a volta bracket.

If the measure immediately following the current measure is found to be under the start of a new volta bracket, then the conditional at step 536 branches to a step 538, which retrieves the iteration indices under the detected volta bracket. Once the volta indices are retrieved and recognized as decimal numbers at step 538, a step 540 checks to see if the iteration count of the current measure matches one of the retrieved iteration numbers. If so, then the detected volta bracket is meant to follow the current measure directly and a step 542 is executed where the index is incremented and the process returned to step 510 to check on the index bounds. If, on the other hand, the iteration count of the current measure is not within the indices found for the volta bracket, then a search is made at a step 544 to retrieve the next volta bracket. If no additional volta brackets exist, then the index is updated to reflect a jump to the measure immediately following the end of the current volta bracket at a step 548, before control is returned to step 510 to continue in the loop processing the measures of the musical score. If, however, step 544 indicates that there is another volta bracket after the current one, then the volta variable is updated to the next consecutive volta at a step 546 and control then returns to step 538 in order to check if the current measure should jump to the measures covered by the subsequent volta bracket.

If the measure immediately following the current one does not have a volta bracket starting on it, then the conditional at step 536 branches to the negative branch and proceeds to a step 550 where a check is made to see if there are any instructions in the musical score to jump to another point in the musical score away to a landing measure, which is a non-consecutive measure from the end of the current measure. Such jump instructions may come in a variety of notational forms including graphical symbols such as a coda or textual form. A number of approaches exist to detect such instructions and, by their positioning, associate them with a particular measure. OCR and neural networks are two of the many ways to address this issue which are well known to those skilled in the arts. If a jump instruction is found, then the instruction at a step 552 is executed whereby the measure index is assigned the index of the measure that is the landing measure, or the destination of the jump. Otherwise, if no jump instruction is detected, then a step 554 is executed where the index is incremented to point to the next consecutive measure from the current measure. Control, in either case, returns to step 510 to check for the index boundaries and potentially begin another iteration of the loop.

In summary, and referring to FIGS. 3 and 5, the traversal routine referred to at step 316 and detailed in flowchart 500 begins at the first enumerated measure, with each consecutively enumerated measure appended to the traversal list as the next measure to visit unless overridden by repeat signs or additional jump instructions that redirects the traversal that would otherwise proceed with its progression through the measures in a stepwise manner from one measure to its consecutive successor, to instead make a jump to a non-consecutive landing measure, which would then be appended into the traversal list with the traversal continuing from the appended measure and the consecutive measure immediately subsequent to it within the enumerated measures list subject to overriding instructions. The traversal terminates when the last measure is reached and no jump instruction is operatively relevant. Flowchart 300 then reaches a termination point 317, whereupon the routine terminates execution and the traversal list is, at this point, a linearized list of how the musical score is to be traversed by measure.

Referring now to FIGS. 6A and 6B, where like numerals identify corresponding parts throughout the views, a simplified musical score is shown to illustrate the process of the present invention. FIG. 6A shows a musical score 600 that spans over two pages, a page 602a and a page 602b. Page 602a displays two lines, a line 604a and a line 604b. Page 602b displays two lines, a line 604c and a line 604d. In some embodiments of the present invention, each measure is assigned a unique identifier indicating its position in the musical score. In other embodiments, measures may be referenced in a unique manner without an identifier but, for the sake of clarity in this illustrative example, unique identifiers are used without loss of generality.

Referring now to FIG. 6B, the indices of the measures are shown over the musical score For illustrative convenience and, when read in sequence, defines the ordered list [1, 2, 3, 4, 5, 6, 7, 8] for the measures in musical score 600. Recalling the definitions of musical notation generally used and illustrated in FIGS. 1A, 1B, and 2, it can be seen that, after applying the exemplary linearization process as described hereabove, the resulting linearized traversal list would be [1, 2, 3, 4, 5, 4, 5, 6, 7, 8]. Here, the fifth element of the list, which is the occurrence of index 5 and is a reference to the fifth measure acting as a takeoff measure to the landing measure which, in this illustrative example, is the fourth measure, as indicated by the index 4 in the sixth element of the list.

In some embodiments, the list of measures, hereabove referred to as the array, m, but is understood to be capable of being equivalently represented by any number of other implementations, may additionally include, for each measure, references to the bounding boxes of the area the corresponding measure occupies in the original rasterized musical score. A bounding box, in this context, refers to a rectangular area within which all the musical notes and associated musical notation for a particular measure are confined. Musical notation may include textual instructions, phrase lines, or any number of other notational markings on a musical score intended to help a musician in playing the piece of the musical score. A bounding box can be defined in a number of ways including being bounded on the left by a vertical bar, inclusive, on the right by another vertical bar, exclusive, on the top by the highest musical note or highest associated musical notation, whichever is higher, and on the bottom by the lowest musical note or lowest associated musical notation, whichever is lower.

Figure 6C:
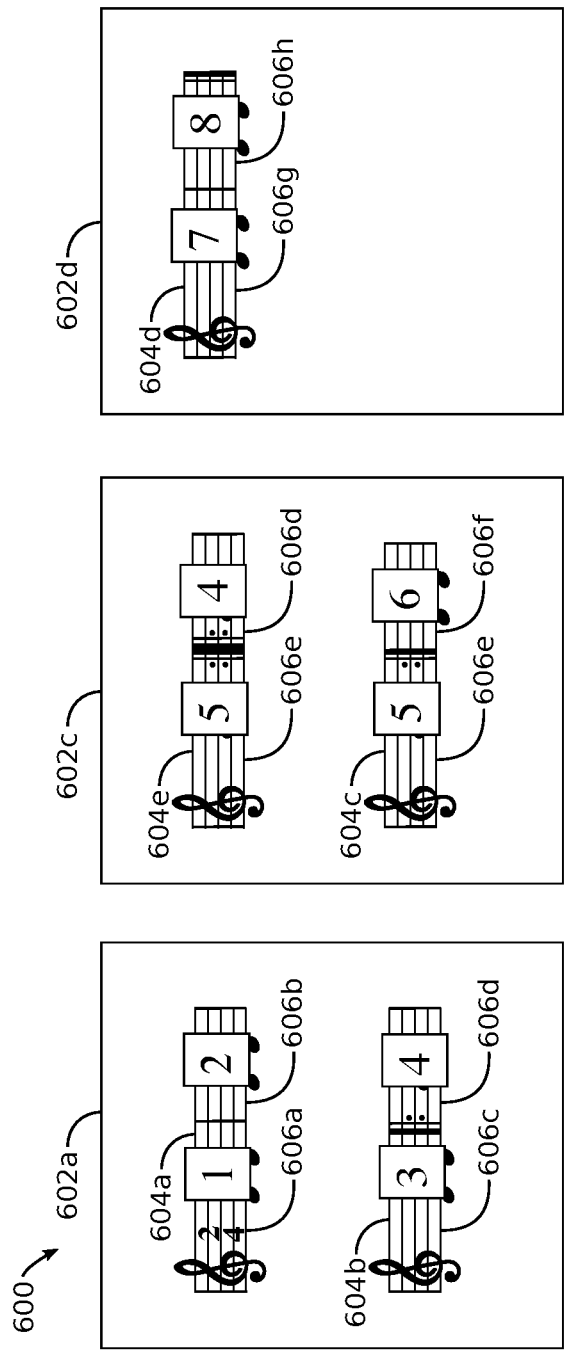

Referring now to FIG. 6C, by using the bounding boxes for the detected measures, a display of the linearized musical score can be rendered by using the bounding box information to crop out a subimage from the rasterized musical score. By placing the subimages in sequence, with each measure defined by its bounding box rendered in linear sequence in the order dictated by the linearized traversal list, an alternative but equivalent musical score can be created that will allow a reader to follow the progress of the music without having to move in a reverse direction. Referring still to FIG. 6C, it can be seen that between lines 604b and 604c is now inserted a new line, 604e, which is followed by lines 604c from page 602c and 604d from page 602d. Line 604e is comprised of measure 606e, or the measure numbered 5, followed by measure 606d, or the measure numbered 4. The rendering of a sequence of rectangular objects of substantially the same height but with potentially different widths, in a linear format and within a limited display over a number of lines, is widely used in such applications as web browsers, and word processors, and is well known to those skilled in the arts.

In some embodiments, as each grand staff is detected, a running count is maintained and each grand staff is assigned a number corresponding to the order in which it was detected. In this way, each distinct grand staff line is associated with a unique identifier. In these embodiments, each measure retains an identifier for the grand staff within which the measure resides in the original musical score. After the construction of the measure-based traversal list is completed, as previously disclosed, some embodiments may construct a parallel list of the same length as the aforementioned traversal list but, for each entry, storing only the index to the grand staff for the corresponding measure in the list. Alternatively, rather than constructing a parallel list, the aforementioned traversal list may be augmented with additional information to yield the same results. Additional different but equivalent approaches are well known to those skilled in the arts and, for the sake of clarity, a parallel list will be used in the description herebelow. Measures found on the same grand staff would, in the aforementioned parallel list, hold values with the same grand staff index. A compression of the aforementioned parallel list can then be made so that like indices occupying consecutive entries in the aforementioned parallel list are consolidated into one entry. Referring now to FIG. 6B for the measure indices and continuing with the same musical score example, the linearized traversal list, previously observed to be [1, 2, 3, 4, 5, 4, 5, 6, 7, 8] would yield a parallel list of [1, 1, 2, 2, 3, 2, 3, 3, 4, 4]. After a compression is made on the aforementioned parallel list, the resulting list would be reduced to [1, 2, 3, 2, 3, 4]. In this way, the aforementioned parallel list would represent the sequence of grand staves—or lines of the musical score—to render without repeating consecutive lines.

A rendering of the linearized musical score, using the aforementioned parallel list can, in this way, be made by line rather than by measure so that a reader would be shown a line repeated in its entirety if the line has at least one measure that is repeated. In some embodiments, the aforementioned parallel list can be rendered to yield the result shown in FIG. 6D. It can be seen, in FIG. 6D, that page 602a is followed by a new page 602e rather than page 602b. New page 602e is comprised of line 604c followed by a repeat of line 604b. New page 602e is followed by another new page 602f, which is substantially the same as original page 602b from FIG. 6B. Note that, in this illustrative example generating a linearized parallel list of grand staff lines, the lines are displayed in their entirety in order to show the repeated measures and, because the lines are rendered in their entirety, they would also show the measures not within the repeated sections.

In some embodiments, data can be associated with each linearized line so that measures that are part of the repeated lines but are not meant to be part of the repeated sections can be displayed in a different manner using visual rendering techniques, as shown in FIG. 6E, where the non-repeated measures in repeated lines are diminished in visibility. Such data indicating a need for some visual techniques to distinguish particular parts of a line can be in the form of associated variable for the non-repeated measures redundantly displayed as part of a partially repeated line so that the measures not to be repeated can be overlaid with a semi-transparent layer to partially obscure the measure that is not meant to be repeated. Referring to both FIGS. 6D and 6E, it can be seen that measures 606f and 606c from lines 604c and 604b, respectively, on page 602e in FIG. 6D have been visually altered to become measures 606i and 606j, from lines 604f and 604g, respectively, on page 602g in FIG. 6E. The data indicating a need for some visual techniques to distinguish particular parts of a line could also be stored as coordinates of regions that are to be visually distinguished and, in general, numerous ways exist to indicate distinguished regions in data structures and are well known to those skilled in the arts.

In some embodiments, as each page is processed, a running count is maintained and each page is assigned a number corresponding to the order in which it was detected. In this way, each distinct page is associated with a unique identifier. In these embodiments, each measure retains an identifier for the page within which the measure resides in the original musical score. After the construction of the measure-based traversal list is completed, as previously disclosed, some embodiments may construct a parallel page list of the same length as the aforementioned traversal list but, for each entry, storing only the index to the page for the corresponding measure in the list. Alternatively, rather than constructing a parallel page list, the aforementioned traversal list may be augmented with additional information to yield the same results. Additional different but equivalent approaches are well known to those skilled in the arts and, for the sake of clarity, a parallel list will be used in the description herebelow. Measures found on the same page would occupy entries, in the aforementioned parallel page list, holding values for the same page index. A compression of the aforementioned parallel page list can then be made so that like indices occupying consecutive entries in the aforementioned parallel page list are consolidated into one entry. Referring now to FIG. 6B for the measure indices and continuing with the same musical score example, the linearized traversal list, previously observed to be [1, 2, 3, 4, 5, 4, 5, 6, 7, 8] would yield a parallel page list of [1, 1, 1, 1, 2, 1, 2, 2, 2, 2]. After a compression is made on the aforementioned parallel page list, the resulting list would be reduced to [1, 2, 1, 2]. In this way, the aforementioned parallel page list would represent the sequence of pages to render without repeating consecutive pages.

A rendering of the linearized page list can, in this way, be made by page rather than by measure so that a reader would be shown a page repeated in its entirety if it has at least one measure that is repeated but would not see the page repeated consecutively in the rendering of the linearized page list. In some embodiments, the linearized page list can be rendered to yield the result shown in FIG. 6F. It can be seen, in FIG. 6F, that the entire score is essentially duplicated so that page 602*a* and page 602*b* are followed by another set of the same pages, namely, page 602*a* and page 602*b*. Note that, in this illustrative example generating a linearized parallel page list, the pages are displayed in their entirety in order to show the repeated measures and, because the pages are rendered in their entirety, they would also show the measures not within the repeated sections.

In some embodiments, data can be associated with each linearized page so that measures that are part of the repeated pages but are not meant to be part of the repeated sections can be displayed in a different manner, as shown in FIG. 6G, where the non-repeated measures in repeated lines are diminished in visibility. Such data indicating a need for some visual techniques to distinguish particular parts of a line can be in the form of associated variable for the non-repeated measures redundantly displayed as part of a partially repeated page so that the measures not to be repeated can be overlaid with a semi-transparent layer to partially obscure the measure that is not meant to be repeated. Referring to both FIGS. 6F and 6G, it can be seen that measure 606*f* from line 604*c*, as well as measures 606*g*, and 606*h* from line 604*d* on page 602*b* in FIG. 6F have been visually altered to become measures 606*i* from line 604*f*, as well as 606*k* and 606*l* from line 604*h* on page 602*h* in FIG. 6G. Still referring to both FIGS. 6F and 6G, it can also be seen that measures 606*a* and 606*b* from line 604*a*, as well as measure 606*c* from line 604*b* on the duplicated and second copy of page 602*a* in FIG. 6F have been visually altered to become measures 606*m* and 606*n* from line 604*i*, as well as measure 606*j* from line 604*g* on page 602*i* in FIG. 6G. The data indicating a need for some visual techniques to distinguish particular parts of a page could also be stored as coordinates of regions that are to be visually distinguished and, in general, numerous ways exist to indicate distinguished regions in data structures and are well known to those skilled in the arts.

Figure 6H:
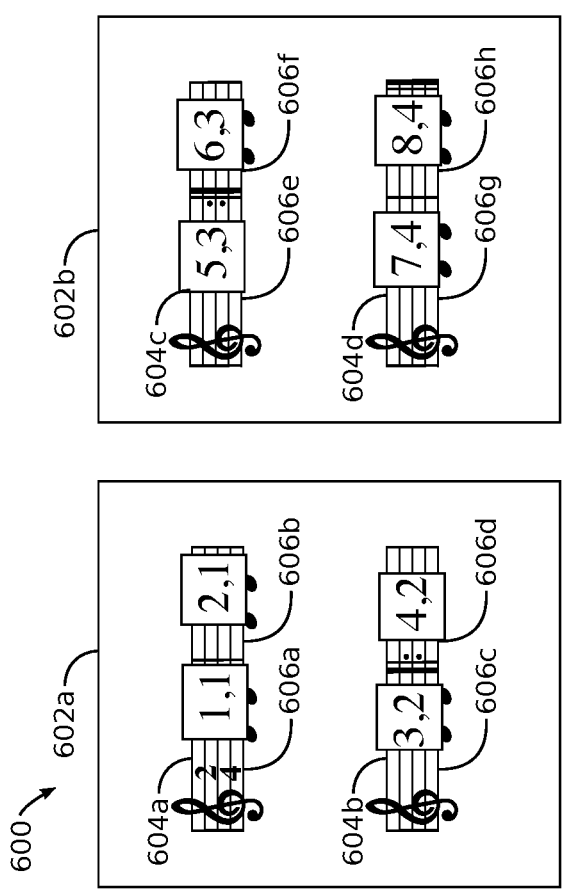

In alternative embodiments, rather than creating a traversal list based upon a musical measure before converting it to a traversal list based on grand staff lines or pages, a compression of musical measures into aggregate units is completed before linearization. For example, in some embodiments, each line of a traditional score is transformed into a musical unit so that linearization is applied to musical units of lines rather than musical units of measures. Referring now to FIG. 6H as well as 6B, in some embodiments, each measure includes, in addition to its unique identifier indicating its position in the ordered list of measures, a line number indicating the line to which the measure belongs. Such additional information associated with each measure allows the algorithm of FIG. 5 to be based upon a basic musical unit of a line rather than a measure. Specifically, each contiguous group of measures sharing the same line number is treated as a single musical unit. When jumps between measures are encountered, they are treated as jumps between lines to which the measures belong with jumps between measures on the same line being ignored. In this way, a linearized traversal list of lines can be generated so that a musical score can be constructed by its constituent lines. A similar approach can be taken for making pages the creating basic units for linearization of a musical score by maintaining a page number reference with each measure and ignoring jumps between measures within the same page while treating jumps between measures from different pages as jumps between pages.

While variable embodiments of the present invention have been described in detail, it is understood that the invention is not limited to the exemplary embodiments and illustrative examples, and that numerous alternative approaches to the implementation of the details for achieve the equivalent results, modifications of the embodiments to achieve similar results, and adaptations of the embodiments to achieve substantially the same results, can be made by those skilled in the arts. However, it is to be expressly understood that any and all such alternative approaches, modifications, and adaptations are within the scope of the present invention, as set forth in the following claims, which are to be accorded the broadest interpretations so as to encompass all equivalent functions and structures for achieving the same results.

What is claimed is:

1. A system for linearizing a traditional musical score, said traditional musical score including a plurality of measures, a plurality of lines, and a plurality of pages, said system comprising:

an input means, said input means accepting said traditional musical score in rasterized format, said musical score in rasterized format representing said traditional musical score as digital data;

a staff means, said staff means detecting a plurality of musical staff lines on said musical score in rasterized format;

a parse means, said parse means parsing through said plurality of musical staff lines to create an ordered plurality of musical units, said ordered plurality of musical units corresponding to sections of music represented within said traditional musical score in the same ordering as presented in said traditional musical score;

a jump detection means, said jump detection means creating a plurality of recognized jump instructions encoded in said musical score in rasterized format directing progression from a takeoff musical unit from said ordered plurality of musical units to a non-consecutive landing musical unit from said ordered plurality of musical units;

a linear sequencing means, said linear sequencing means creating a linearized list of items, each item from said linearized list of items associated with exactly one musical unit from said ordered plurality of musical units, said linearized list of items
  i. beginning with an initial item associated with an initial musical unit from said ordered plurality of musical units, said initial musical unit corresponding to the beginning of said traditional musical score,
  ii. following said initial item with a plurality of subsequent items, each subsequent item from said plurality of subsequent items associated with a subsequent musical unit while also each said subsequent item immediately subsequent to a preceding item, said preceding item associated with a preceding musical unit, said subsequent musical unit immediately subsequent to said preceding musical unit in accordance to standard musical notation rules, said standard musical notation rules ordering said subsequent musical unit to be either consecutively subsequent to said preceding musical unit or said subsequent musical unit to be a jump instruction landing musical unit from said plurality of recognized jump instructions with said preceding musical unit as a jump instruction takeoff musical unit from said plurality of recognized jump instructions; and iii. terminating with a last item associated with a last musical unit in said ordered plurality of musical units, said last musical unit corresponding to the end of said traditional musical score.

2. The system of claim 1, wherein said input means retrieves, from a storage memory connected to said input means through wired or wireless transmission via a direct or networked connection, an existing digitized version of a said traditional musical score, said existing digitized version convertible into a rasterized format.

3. The system of claim 1, wherein said input means is a camera configured to capture an image of said traditional musical score and converting the captured image into digital data convertible into a rasterized format.

4. The system of claim 1, wherein each musical unit corresponds to a measure from said plurality of measures in said traditional musical score and each item corresponds to a measure from said plurality of measures in said traditional musical score.

5. The system of claim 4, further including a line conversion means, said line conversion means converting said linearized list of items into a linearized list of line items, each line item representing a line from said plurality of lines from said traditional musical score, said line including corresponding measure of an item from said linearized list of items, and consecutive line items representing a same line are compressed into a singular line item representing said same line.

6. The system of claim 5, further including a flagging means, said flagging means demarcating a plurality of portions of said line items to be included for visual rendering as part of said line items but not to be interpreted musically as part of said traditional musical score.

7. The system of claim 4, further including page conversion means, said page conversion means converting said linearized list of items into a linearized list of page items, each page item representing a page from said plurality of pages from said traditional musical score, said page including corresponding measure of an item from said linearized list of items, and consecutive page items representing a same page are compressed into a singular page item representing said same page.

8. The system of claim 7, further including a flagging means, said flagging means demarcating a plurality of portions of said page items, said plurality of portions understood to be included but not to be interpreted musically as part of said traditional musical score.

9. The system of claim 1, wherein each musical unit corresponds to a line from said plurality of lines in said traditional musical score, so that all jumps into a measure within a line from a second measure from a second line, said second line distinct and separate from said line being interpreted as a jump to said line from said second line;

all jumps from a measure within said line to a second measure in a second line, said second line distinct and separate from said line being interpreted as a jump from said line to said second line;

and each jump from a measure within said line to a second measure within said line is discarded.

10. The system of claim 1, wherein each musical unit corresponds to a page from said plurality of pages in said traditional musical score, so that all jumps into a measure within a page from a second measure from a second page, said second page distinct and separate from said page being interpreted as a jump to said page from said second page;

all jumps from a measure within said page to a second measure in a second page, said second page distinct and separate from said page being interpreted as a jump from said page to said second page;

and each jump from a measure within said page to a second measure within said page is discarded.

11. A method for linearizing a traditional musical score, said traditional musical score including a plurality of measures, a plurality of lines, and a plurality of pages, said method:

accepting said traditional musical score in rasterized format, said musical score in rasterized format representing said traditional musical score as digital data;

detecting a plurality of musical staff lines on said musical score in rasterized format;

parsing through said plurality of musical staff lines to create an ordered plurality of musical units, said ordered plurality of musical units corresponding to sections of music represented within said traditional musical score in the same ordering as presented in said traditional musical score;

creating a plurality of recognized jump instructions encoded in said musical score in rasterized format directing progression from a takeoff musical unit from said ordered plurality of musical units to a non-consecutive landing musical unit from said ordered plurality of musical units;

creating a linearized list of items, each item from said linearized list of items associated with exactly one musical unit from said ordered plurality of musical units, said linearized list of items i. beginning with an initial item associated with an initial musical unit from said ordered plurality of musical units, said initial musical unit corresponding to the beginning of said traditional musical score, ii. following said initial item with a plurality of subsequent items, each subsequent item from said plurality of subsequent items associated with a subsequent musical unit while also each said subsequent item immediately subsequent to a preceding item, said preceding item associated with a preceding musical unit, said subsequent musical unit immediately subsequent to said preceding musical unit in accordance to standard musical notation rules, said standard musical notation rules ordering said musical unit to be either consecutively subsequent to said preceding musical unit or said musical unit to be a jump instruction landing musical unit from said plurality of recognized jump instructions with said preceding musical unit as a jump instruction takeoff musical unit from said plurality of recognized jump instructions; and iii. terminating with a last item associated with a last musical unit in said ordered plurality of musical units, said last musical unit corresponding to the end of said traditional musical score.

12. The method of claim 11, wherein an existing digitized version of a said traditional musical score is accepted from a storage memory through wired or wireless transmission via a direct or networked connection, said existing digitized version convertible into a rasterized format.

13. The system of claim 11, wherein an image of said traditional musical score is captured by a camera as digital data and convertible into a rasterized format.

14. The system of claim 11, wherein each musical unit corresponds to a measure from said plurality of measures in said traditional musical score and each item corresponds to a measure from said plurality of measures in said traditional musical score.

15. The system of claim 14, further converting said linearized list of items into a linearized list of line items, each line item representing a line from said plurality of lines from said traditional musical score, said line including corresponding measure of an item from said linearized list of items, and consecutive line items representing a same line are compressed into a singular line item representing said same line.

16. The system of claim 15, further demarcating a plurality of portions of said line items to be included for visual rendering as part of said line items but not to be interpreted musically as part of said traditional musical score.

17. The system of claim 14, further converting said linearized list of items into a linearized list of page items, each page item representing a page from said plurality of pages from said traditional musical score, said page including corresponding measure of an item from said linearized list of items, and consecutive page items representing a same page are compressed into a singular page item representing said same page.

18. The system of claim 17, further demarcating a plurality of portions of said page items, said plurality of portions understood to be included but not to be interpreted musically as part of said traditional musical score.

19. The system of claim 11, wherein each musical unit corresponds to a line from said plurality of lines in said traditional musical score, so that
- all jumps into a measure within a line from a second measure from a second line, said second line distinct and separate from said line being interpreted as a jump to said line from said second line;
- all jumps from a measure within said line to a second measure in a second line, said second line distinct and separate from said line being interpreted as a jump from said line to said second line;
- and each jump from a measure within said line to a second measure within said line is discarded.

20. The system of claim 11, wherein each musical unit corresponds to a page from said plurality of pages in said traditional musical score, so that
- all jumps into a measure within a page from a second measure from a second page, said second page distinct and separate from said page being interpreted as a jump to said page from said second page;
- all jumps from a measure within said page to a second measure in a second page, said second page distinct and separate from said page being interpreted as a jump from said page to said second page;
- and each jump from a measure within said page to a second measure within said page is discarded.

* * * * *